United States Patent
Narushima (10) Patent No.: US 6,597,527 B1
(45) Date of Patent: Jul. 22, 2003

(54) DATA STORAGE MEDIUM TRANSPORTATION UNIT

(75) Inventor: Toru Narushima, Tokyo (JP)

(73) Assignee: NEC Corporation, Tokyo (JP)

( * ) Notice: Subject to any disclaimer, the term of this patent is extended or adjusted under 35 U.S.C. 154(b) by 569 days.

(21) Appl. No.: 09/597,489

(22) Filed: Jun. 19, 2000

(30) Foreign Application Priority Data

Jun. 18, 1999 (JP) .......................................... 11-172617

(51) Int. Cl.$^7$ ............................................. G11B 15/18
(52) U.S. Cl. ...................................................... 360/69
(58) Field of Search ................................ 360/69, 78.09, 360/78.06

(56) References Cited

U.S. PATENT DOCUMENTS

| | | | |
|---|---|---|---|
| 4,879,660 A | * 11/1989 | Asakura et al. | 364/474.15 |
| 5,087,997 A | * 2/1992 | Osada et al. | 360/78.06 |
| 5,608,394 A | * 3/1997 | Hirabayashi | 341/11 |
| 6,097,565 A | * 8/2000 | Sri-Jayantha et al. | 360/78.09 |

* cited by examiner

Primary Examiner—David Hudspeth
Assistant Examiner—Fred F. Tzeng
(74) Attorney, Agent, or Firm—Young & Thompson (57) ABSTRACT

The present invention provides a data storage medium transportation unit not requiring a complicated servo control, obtainable at a reasonable cost, and capable of detecting a feed speed and feed position of a data storage medium holding block. The feed speed of the data storage medium holding block 104 is open-loop controlled by controlling the speed of a DC motor 3 using a PWM control circuit 18. A rotation position detector 14 is mounted on a rotary shaft 6 of a power transmission mechanism 4, so as to obtain, using an optical sensor 15, a detected pulse count ΔC representing an actual feed speed of the data storage medium holding block 104. An actual feed speed failure is detected if the pulse count ΔC is out of a reference speed range C1 to C2. Since the feed speed of the data storage medium holding block 104 is controlled by the PWM control for the DC motor 3, the production cost is reduced as compared to a case using an expensive servo motor. Moreover, since the rotation position detector 14 is mounted on the rotary shaft 6, it is possible to detect an actual feed speed.

17 Claims, 8 Drawing Sheets

DATA STORAGE MEDIUM TRANSPORTATION UNIT

BACKGROUND OF THE INVENTION

1. Field of the Invention

The present invention relates to a library apparatus of a composite type magnetic tape apparatus or the like and in particular, to an improvement of a data storage medium transportation unit for selecting a data storage medium from a plurality of data storage media stored in a data storage medium container and carrying the selected data storage medium to a read/write block or returning a data storage medium from the read/write block to the data storage medium container.

2. Description of the Related Arts

There is a known configuration of the data storage medium transportation unit for holding a data storage medium between the data storage medium container and the rear/write block. For example, a data storage medium is guided by a guide rail and transported by a timing belt and a screw type feed mechanism.

Figure 7:
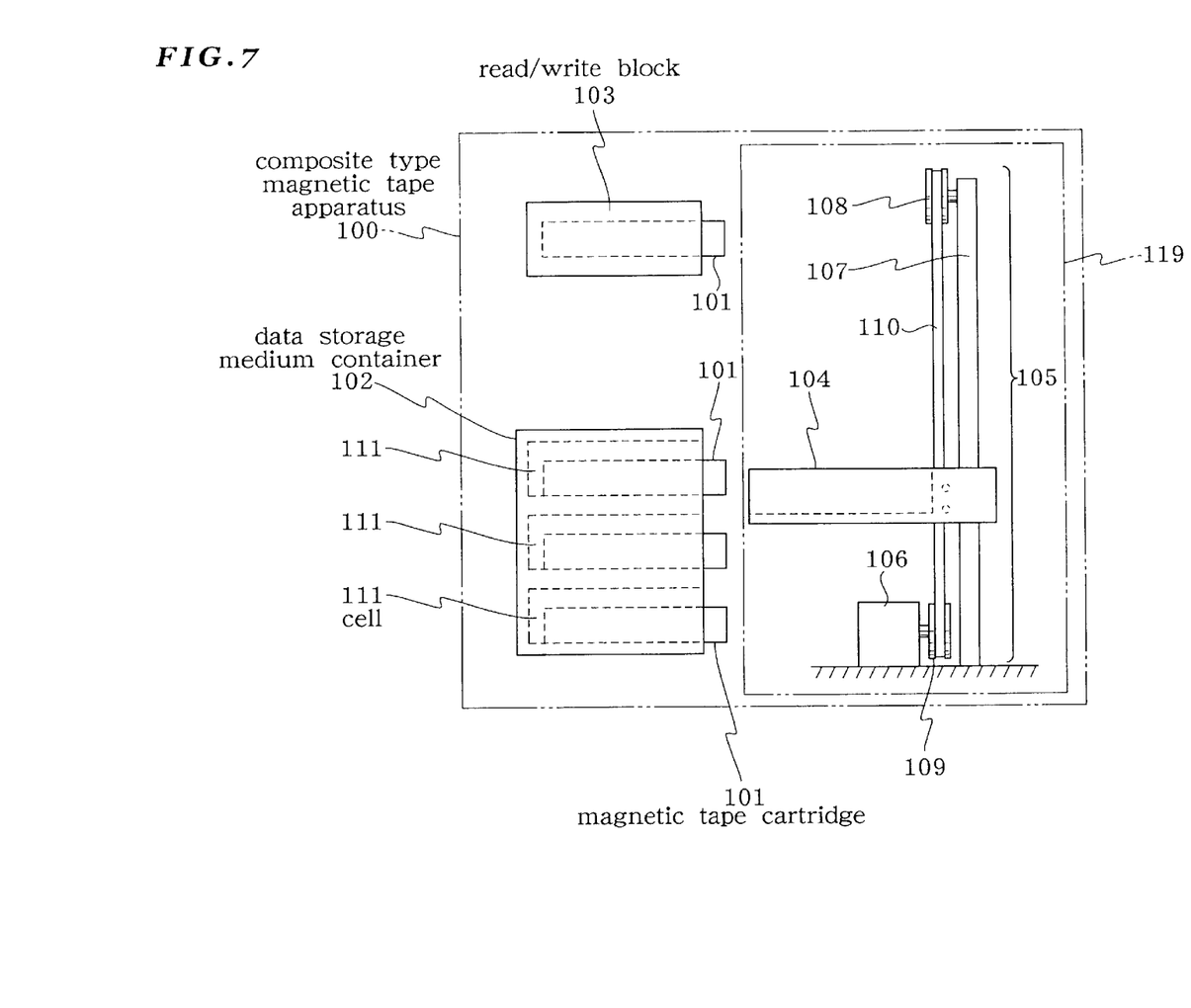
FIG. 7 is a conceptual view showing an ordinary configuration example of a composite type magnetic tape apparatus.

FIG. 7 is a conceptual representation of such a configuration. This is an example of composite type magnetic tape apparatus in which a magnetic tape cartridge is used as the data storage medium.

The composite type magnetic tape apparatus 100 shown in FIG. 7 includes a data storage medium container 102 for storing a plurality of magnetic tape cartridges 101, a read/write block 103 for reading and writing a data from/to the magnetic tape cartridge 101, and a data storage medium transportation unit 119.

The data storage medium transportation unit 119 includes: a data storage medium holding block 104 for which reciprocally moves with a magnetic tape cartridge 101 between the data storage medium container 102 and the read/write block 103; a power transmission mechanism 105 for vertically driving the data storage medium holding block 104; and a motor 106.

The power transmission mechanism 105 includes: a guide rod 107 for vertically guiding the data storage medium holding block 104; a driven pulley 108 rotatably attached to the top of the guide rod 107; a drive pulley 109 fixed to a shaft of the motor 106, and a timing belt 110 extending between the pulleys 108 and 109 so as to surround the pulleys 108 and 109. A portion of the timing belt 110 is fixed to the data storage medium holding block 104.

Accordingly, when this motor 106 is driven, the timing belt 110 is rotated and the data storage medium holding block 104 fixed to this timing belt 110 is raised or lowered along the guide rod 107 according to the rotation direction of the motor 106, so that the data storage medium holding block 104 moves between the data storage medium container 102 and the read/write block 103.

The data storage medium holding block 104 has a pickup mechanism (not depicted) for taking out a magnetic tape cartridge 101 from the data storage medium container 102 and the read/write block 103 or remounting the magnetic tape cartridge 101, so that the magnetic tape cartridge 101 is taken out or remounted between the data storage medium container 102 or the read/write block 103 and the data storage medium holding block 104.

The data storage medium container 102 has a plurality of layered cells 111 layered in a vertical direction. In order to pass the magnetic tape cartridge 101 horizontally between a cell and the data storage medium holding block 104, the data storage medium holding block 104 should be accurately positioned to match the height of each of the cells 111.

For this, in the conventional composite type magnetic tape apparatus 100, the motor 106 serving as a drive source of the data storage medium holding block 104 has been constituted by an expensive servo motor, and a complicated control unit has been used for performing a feed back control of respective loops concerning the position and the speed.

Figure 8:
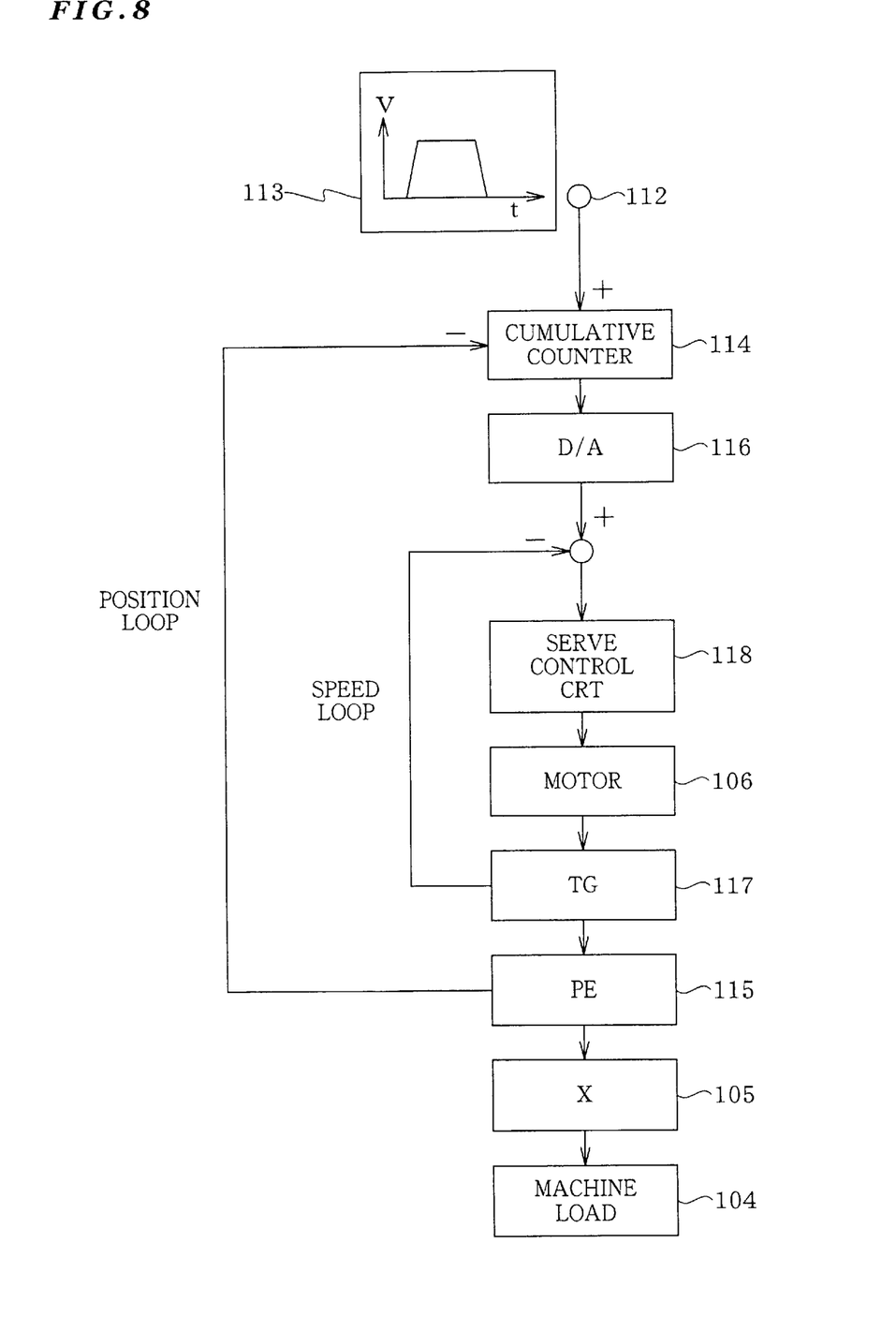
FIG. 8 is functional block diagram showing a simplified ordinary servo control.

FIG. 8 shows a concept of a general servo control. A reference symbol 112 represents a rotation-shift instruction. A microprocessor in a control unit performs pulse assignment according to a predetermined speed pattern 113 and outputs a rotation-shift instruction, i.e., a substantial rotation speed instruction for each pulse assignment cycle. Moreover, each time the microprocessor outputs the rotation-shift instruction, a value of the current rotation-shift instruction is deleted from a target value of the rotation shift amount stored in an assignment amount storage register, so as to determine a final rotation shift amount. That is, the pulse assignment processing is complete when the value of the assignment amount storage register has become zero.

The rotation-shift instruction 112 which is output from the control unit is added, for each processing cycle, to an accumulation counter 114, and a return pulse from a pulse encoder 115 of the motor 106, i.e., a feed back value of an actual rotation-shift amount of the motor 106 is deleted from the accumulation counter 114, so that a current value of the accumulation counter 114 is fed as a rotation speed instruction according to a rotation-shift deviation to an D/A converter 116. Accordingly, the motor 106 delays to follow the rotation-shift instruction 112 and the rotation-shift position deviation increases, which in turn increases the current value of the accumulation counter 114 and the value of the speed instruction. Moreover, when the rotation-shift deviation has become zero, the value the speed instruction also becomes zero, and the motor 106 retains its rotation position.

Moreover, the rotation speed instruction which is output from the D/A converter 116 is deleted by an output value of a tachogenerator 117 of the motor 106, i.e., the actual rotation speed of the motor 106, and the resultant value is fed as a torque instruction according to the rotation speed deviation, to a servo control circuit 118. Accordingly, if the motor 106 delays to follow the rotation speed instruction to increase the rotation speed deviation, the torque instruction fed to the servo control circuit 118 is also increased. Moreover, when the rotation speed deviation has become zero, the torque instruction also becomes zero, the motor 106 retains its rotation position.

The servo control circuit 118 fed with the torque instruction controls the motor 106 by power amplitude processing or the like, and vertically drives the data storage medium holding block 104 as a mechanical load via the power transmission mechanism 105.

Such a servo control enables to obtain a stable drive speed of the data storage medium holding block 104 with a high positioning accuracy. However, such a servo control requires peripheral apparatuses including the accumulation counter 114, the D/A converter 116, the servo control circuit 118, and the tachogenerator 117. That is, the production cost is increased. Moreover, in order to perform pulse assignment, the processing of the microprocessor should be performed as multi task, which increases the load of the microprocessor itself.

In order to eliminate these defects, the applicant of the present invention has suggested a data carrier loader as Japanese Patent Publication 10-366906, in which a protrusion of a data storage medium holding block is engaged with a rotary shaft having a helical groove on its circumferential portion, so that the data storage medium holding block is fed in the shaft axis direction.

The rotary shaft of this data carrier loader has a lead (distance advancing in the axis direction) zero portion as a flat portion for positioning, i.e., an interval where the position of the data storage medium holding block is not changed even if the rotary shaft is rotated, so that the positioning of the data storage medium holding block can be accurately performed even if the rotation position of the rotary shaft is not accurate. Thus, control is simplified and the positioning accuracy is increased.

The data carrier loader of Japanese Patent Publication 10-366906 can obtain a final positioning of a data storage medium holding block with a high accuracy even with rough control, and there is no need of measuring the rotation position of the rotary shaft with a high accuracy. Accordingly, the data carrier loader has, as position detection means, only a detector for detecting a turn of the rotary shaft.

Accordingly, this data carrier loader has inconvenience in detecting a shift speed and shift position of the data storage medium holding block, and in detecting abnormal operation according to the shift speed and shift position, such as an overload due to a drive system failure.

SUMMARY OF THE INVENTION

It is therefore an object of the present invention to provide a data storage medium transportation unit not requiring a complicated servo control, obtainable at a reasonable cost, and capable of detecting a shift speed and shift position of the data storage medium holding block.

The data storage medium transportation unit according to the present invention comprises:
- a data storage medium holding block which holds a data storage medium and reciprocally moves between a data storage medium container and a read/write block; a motor which is a non-servo motor for driving the data storage medium holding block; a power transmission mechanism arranged between the data storage medium holding block and the motor for converting a rotary power of the motor into a drive force of the data storage medium holding block in its travelling direction; a disc-shaped rotation position detector provided in a rotary portion of the power transmission mechanism and having a plurality of identification areas arranged at an identical interval in a circumferential direction; an optical sensor provided on a non-movable portion of the data storage medium transportation unit and arranged so as to detect the identification areas of the rotation position detector; a speed control block for PWM (pulse width modulation) control of the non-servo motor, said speed control block including a counter for counting the number of identification areas detected by the optical sensor within a predetermined period of time, and a feed speed calculator for calculating a feed speed of the data storage medium holding block according to a value obtained by the counter.

Since the feed speed of the data storage medium holding block is controlled by the PWM control for a non-servo motor, there is no need of using an expensive servo motor and the production cost can be reduced.

Moreover, the rotation portion of the power transmission mechanism includes the disc-shaped rotation position detector having a plurality of identification areas which are detected by the optical sensor. The number of the identification areas detected by the optical sensor within a predetermined period of time is counted by the counter and the counted number is used by the feed speed calculator to calculate a feed speed of the data storage medium holding block. Thus, the feed speed and the feed position can be detected according to the resolution of the identification areas without applying a complicated servo control associated with feedback of the speed and the position.

Moreover, the feed speed calculated by the feed speed calculator is compared to a predetermined reference speed range. If the feed speed calculated by the feed speed calculator is out of the predetermined reference speed range, a speed error is detected by speed error detection means. Thus, it is possible to automatically detect a speed error of the data storage medium holding block.

Furthermore, the feed speed detection means is constituted so as to repeatedly calculate the feed speed of the data storage medium holding block with a cycle of the aforementioned predetermined period of time, enabling to monitor the feed speed all the time during the operation of the apparatus.

Moreover, a difference between the feed speed calculated by the feed speed calculator and a predetermined target speed is obtained and according to this difference, the duty ratio in the PWM (pulse width modulation) control is adjusted by the speed adjuster. This enables to obtain a feedback control of the feed speed substantially equivalent to a servo motor.

The identification areas of the rotation position detector may be defined by slits extending in the radial directions of the disc. The optical sensor may consist of a light emitting block and a light receiving block which are arranged so as to sandwich the rotation position detector.

Furthermore, the power transmission mechanism includes a guide member for guiding the feed direction of the data storage medium holding block, a rotary shaft having a helical groove on the outer circumference and arranged along the guide direction of the guide member, and a protrusion provided on the data storage medium holding block so as to be engaged with the groove of the rotary shaft, wherein helical groove of the rotary shaft has lead-zero flat portions for positioning. Accordingly, even by driving the motor with a rough positioning accuracy, it is possible to correctly position the data storage medium holding block at a target position.

DESCRIPTION OF THE PREFERRED EMBODIMENTS

Figure 1:
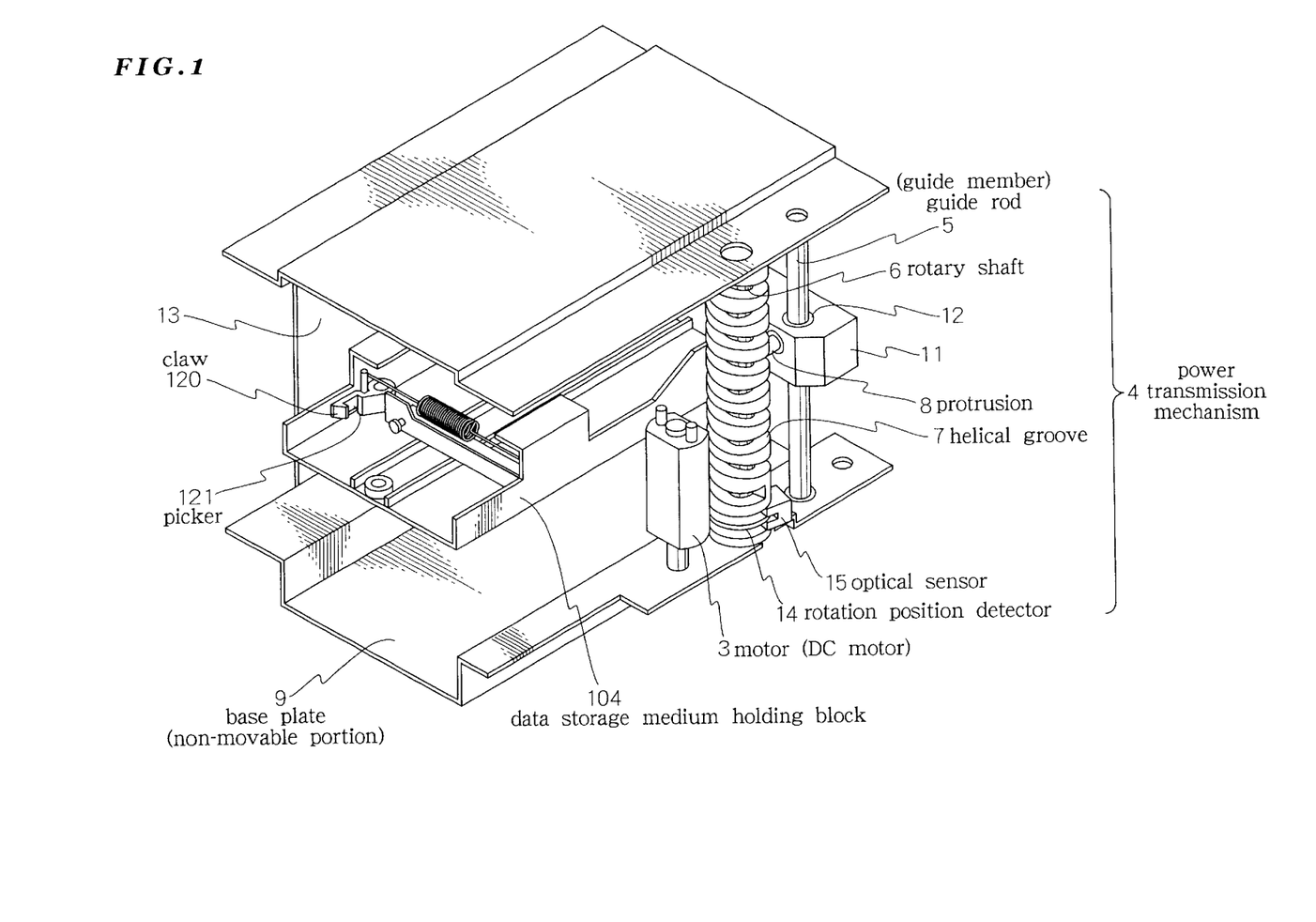
FIG. 1 is a perspective view of a mechanical structure of a data storage medium transportation unit according to an embodiment of the present invention.

Hereinafter, an embodiment of the present invention will be detailed with reference to the attached drawings. FIG. 1 is a perspective view showing a mechanical configuration of a data storage medium transportation unit 1 according to an embodiment of the present invention.

This data storage medium transportation unit 1, like in the conventional one, transports a data storage medium such as a magnetic tape cartridge between a data storage medium container and a read/write block in a composite type magnetic tape apparatus and, for example, can replace the data storage medium transportation unit 119 in the conventional composite type magnetic tape apparatus 100 as shown in FIG. 7.

As shown in FIG. 1, the data storage medium transportation unit 1 according to the present embodiment includes a data storage medium holding block 104, a motor 3, and a power transmission mechanism 4.

The data storage medium holding block 104 has a configuration basically identical to the conventional one and includes a pickup mechanism for taking out and reloading a magnetic tape cartridge 101 from/to a data storage medium container 102 and a read/write block 103 of the composite magnetic tape apparatus 100. This pickup mechanism includes a picker 121 having a claw 120 to hold the magnetic tape cartridge 101 and a picker drive mechanism (not depicted) for displacing the picker 121 to right and left in FIG. 1 so as to take out or reload the magnetic tape cartridge 101.

The power transmission mechanism 4, as shown in FIG. 1, includes a guide rod 5, a rotary shaft 6, and a protrusion 8.

At one side of the data storage medium holding block 104, there is provided a hole 12 for inserting a guide rod 5 having one end fixed to a base plate and the other end fixed to a top plate of the data storage medium transportation unit 1. This guide rod 5 vertically guides the data storage medium holding block 104.

Moreover, the rotary shaft 6 having a helical groove 7 is arranged in parallel to and at a small distance from the guide rod 5. The rotary shaft 6 has one end held by a hole provided in the base plate 9 and the other end held by a hole provided in the top plate 10 of the data storage medium transportation unit 1. The protrusion 8 fixed to a protruding portion 11 of the data storage medium holding block 104 is engaged with the groove 7 of the rotary shaft 6. As shown in FIG. 1, one side of the data storage medium holding block 104 is in a sliding contact with a side plate 13 of the data storage medium transportation unit 1 and accordingly, the data storage medium holding block 104 will not rotate around the guide rod 5.

The motor 3 is arranged in parallel to and at a small distance from the rotary shaft 6, and has a bottom fixed to the base plate 9 of the data storage medium transportation unit 1 excluding the motor shaft which protrudes through the base plate 9. The rotary shaft 6 is driven to rotate via a spur gear fixed to the bottom of the rotary shaft 6 protruding through the base plate 9 and a pinion gear fixed to the tip end of the motor shaft. The motor is a non-servo motor, for example, an ordinary DC motor.

Moreover, a disc-shaped rotation position detector 14 is attached to the bottom of the rotary shaft 6, and an optical sensor 15 is arranged on the base plate 9 in such a manner that the optical sensor 15 sandwiches the position detector 14 from above and below.

Accordingly, when the motor 3 is driven, the rotary shaft 6 is driven to rotate via the aforementioned pinion gear and the spur gear, and the helical groove 7 of the rotary shaft 6 vertically feeds the protrusion 8 so that the data storage medium holding block 104 is vertically moved along the guide rod 5.

Figure 2A:
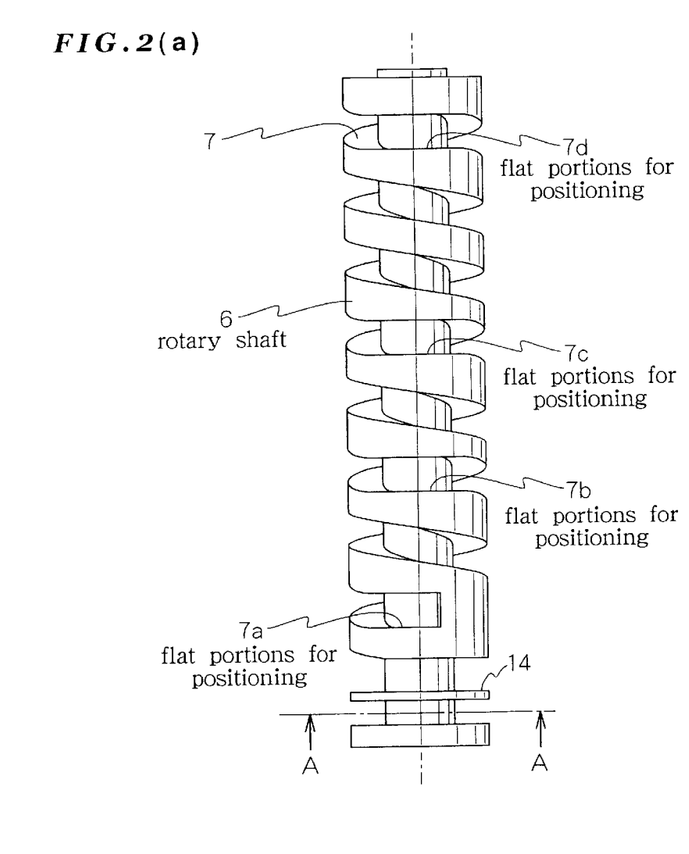
FIG. 2(a) shows a detailed configuration of a rotary shaft of the first embodiment.

FIG. 2(a) shows an outer configuration of the rotary shaft 6. The helical groove 7 of the rotary shaft 6 has four lead-zero flat portions 7a, 7b, 7c, and 7d for positioning where the vertical position of the data storage medium holding block 104 does not change even if the rotary shaft 6 is rotated.

The flat portion 7a is used for positioning the data storage medium holding block 104 at the lowermost cell 111 of the data storage medium container 102 as shown in FIG. 7. The flat portion 7b is used for positioning the data storage medium holding block 104 at the intermediate cell 111 of the data storage medium container 102. Moreover, the flat portion 7c is used for positioning the data storage medium holding block 104 at the uppermost cell 111 of the data storage medium container 102, and the flat portion 7d is used for positioning the data storage medium holding block 104 at the read/write block 103 as shown in FIG. 7.

With this configuration, the data storage medium holding block can accurately be positioned for each of the cells 111 or the read/write block even if the rotation position of the rotary shaft 6 is slightly shifted. That is, the rotation position of the motor 3 need be only roughly controlled for finally positioning the data storage medium holding block 104 accurately.

Figure 2B:
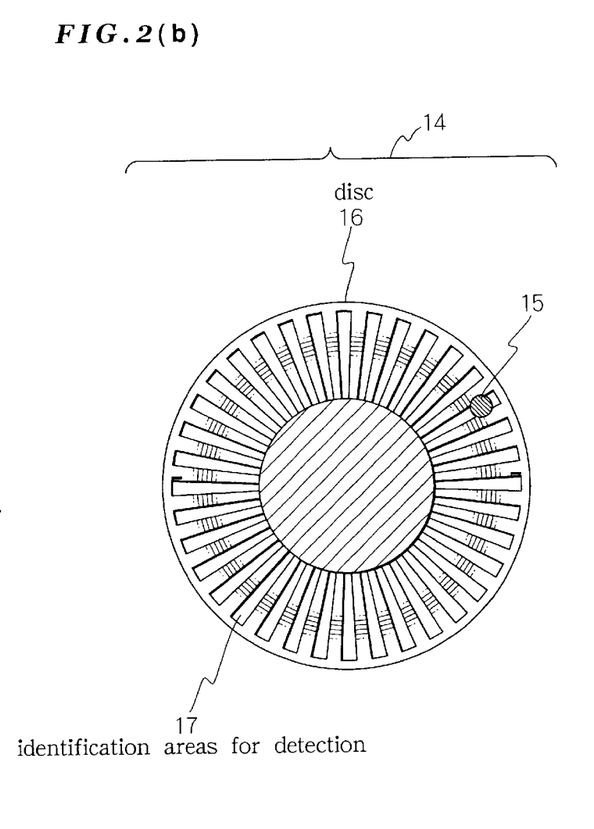
FIG. 2(b) is an enlarged view of a rotation position detector of the first embodiment.

FIG. 2(b) shows the rotation position detector 14 enlarged along the line A—A in FIG. 2(a). The rotation position detector 14 according to the present embodiment is a disc 16 made from a thin metal plate and having a number of slits extending in the radial direction as identification areas 17. With respect to this configuration, the optical sensor 15 includes a light receiving element and a light emitting element constituting a transmitted light type optical sensor. It is also possible to paint the disc 16 with dark and light paints, to which a reflected light type optical sensor is applied. As is clear from FIG. 2(b), the rotation position detector 14 of this embodiment has a resolution of 10 degrees.

Figure 3:
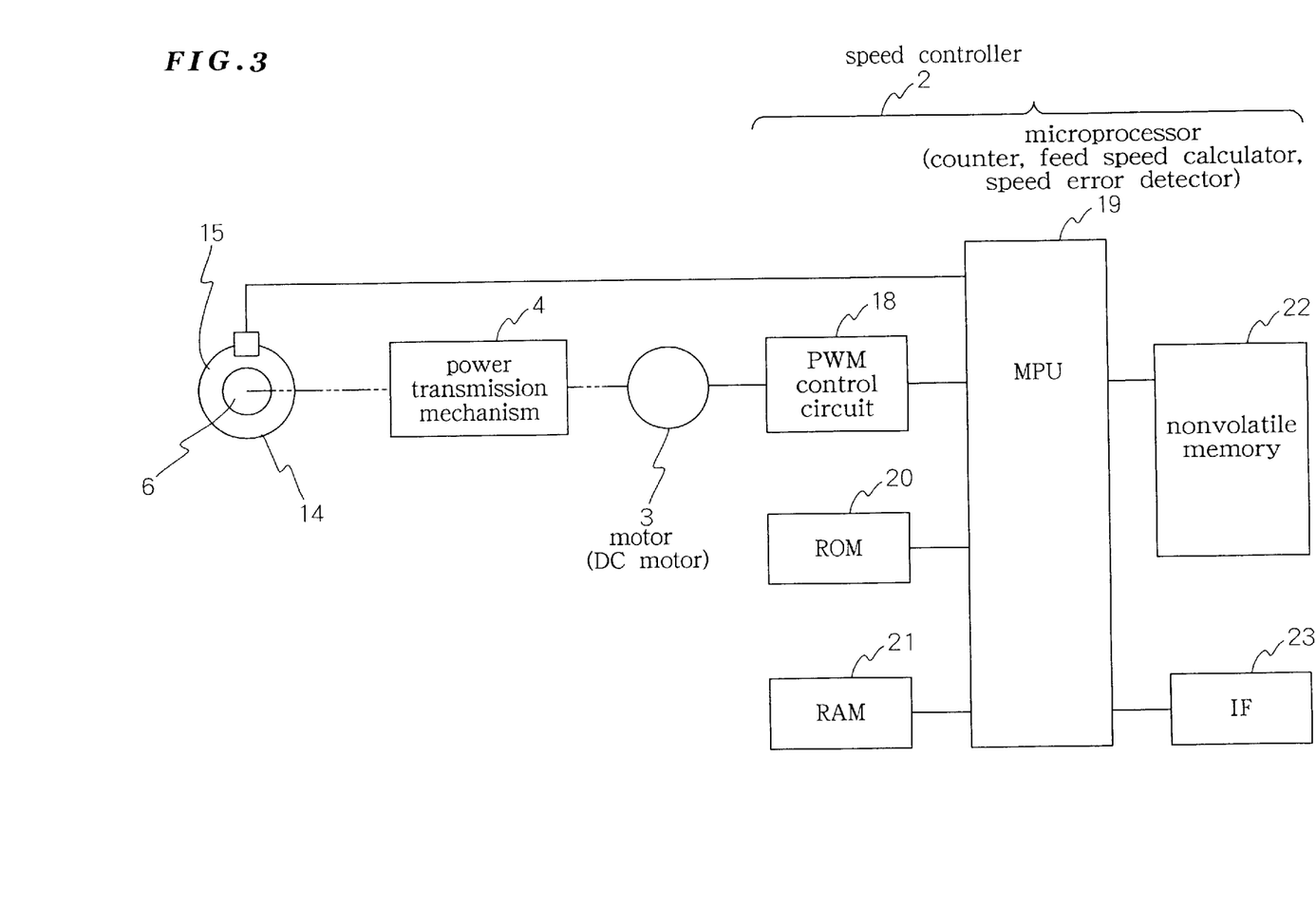
FIG. 3 is a block diagram of a speed controller of the data storage medium transportation unit of the first embodiment.

FIG. 3 is a block diagram showing a simplified configuration of a speed controller 2 of the data storage medium transportation unit 1. The speed controller 2 includes: PWM (pulse width modulation) control circuit 18 for adjusting the rotation speed of the motor 3 by changing the ON/OFF duty ratio of the power supplied to the motor 3; and a microprocessor (hereinafter, referred to as MPU) 19 for performing the ON/OFF control and duty ration setting for the PWM control circuit 18.

The MPU 18 has a function as a counter for counting the number of pulses produced from the optical sensor 15 within a predetermined period of time, a function as feed speed calculator for calculating, according to the obtained count, the feed speed of the data storage medium holding block 104, and a function as speed failure detection means for comparing the calculated feed speed to a predetermined reference speed range so as to detect a feed speed and a drive system failure if any.

A program for performing these functions is stored in a ROM 20, and parameters required for controlling the feed speed and positioning are stored in a nonvolatile memory 22. A RAM 21 is used for temporary storage of data during an arithmetic processing. Moreover, an interface circuit 23 is used for connection with an upper node apparatus such as a host computer.

Figure 4:
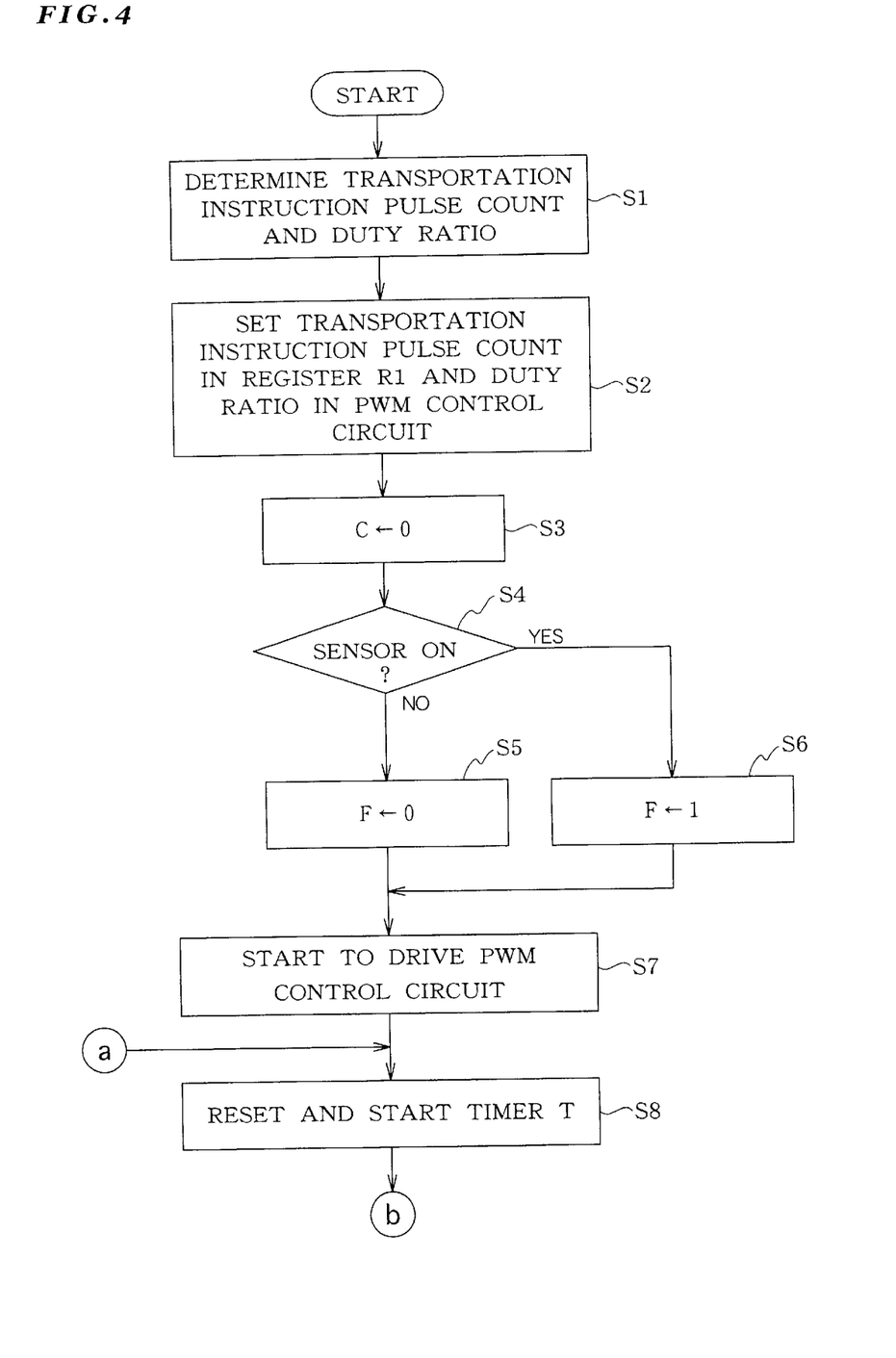
FIG. 4 is a flowchart showing outline of a processing related to a position and speed control of the data storage medium holding block.
Figure 5:
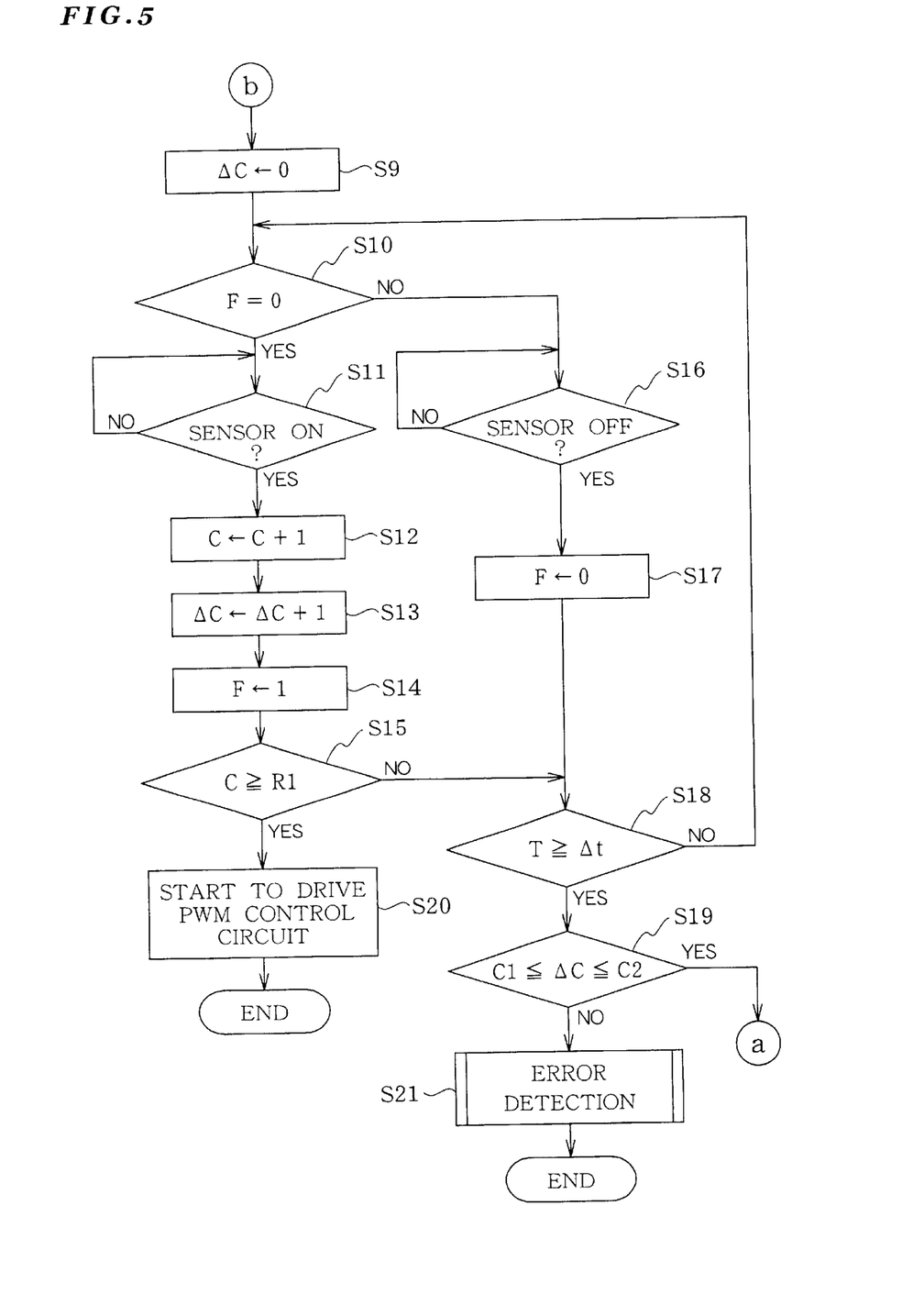
FIG. 5 is a continuation of the flowchart of FIG. 4.

FIG. 4 and FIG. 5 are flowcharts showing an outline of the processing associated with speed control of the data storage medium holding block 104. The processing shown in these flowcharts is performed each time an operation instruction with respect to the data storage medium holding block 104 is input from an upper node apparatus such as a host computer.

Upon detection of an operation instruction from the upper node apparatus, the MPU 19, firstly, uses a relationship between the current position (feed start position) of the data storage medium holding block 104 and a target position, so as to obtain a feed amount (incremental amount) of the data storage medium holding block 104 and a feed speed according to the operation instruction (step S1). It should be noted that the incremental amount means the number of pulses to be detected by the optical sensor 15 until the feed amount is achieved (hereinafter, referred to as a feed instruction pulse), and the feed speed means a duty ratio of the PWM control corresponding to the feed speed.

Next, the MPU 19 loads on a register R1 a feed amount up to the target position, i.e., the feed instruction pulse value and loads on the PWM control circuit 18 a target feed speed, i.e., the duty ratio value (step S2).

Figure 6A:
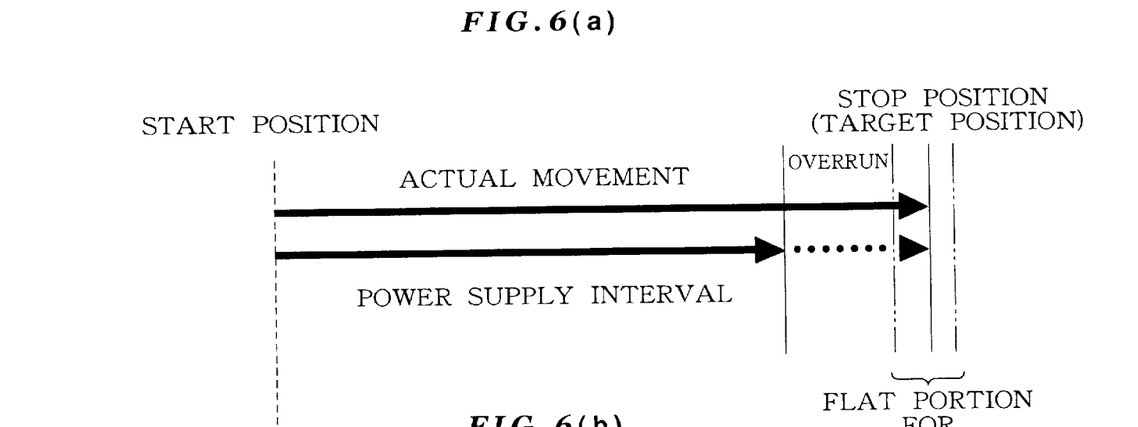
FIG. 6(a) is a conceptual view showing a relationship between an actual shift amount of the data storage medium holding block and a power supply to a motor.
Figure 6B:
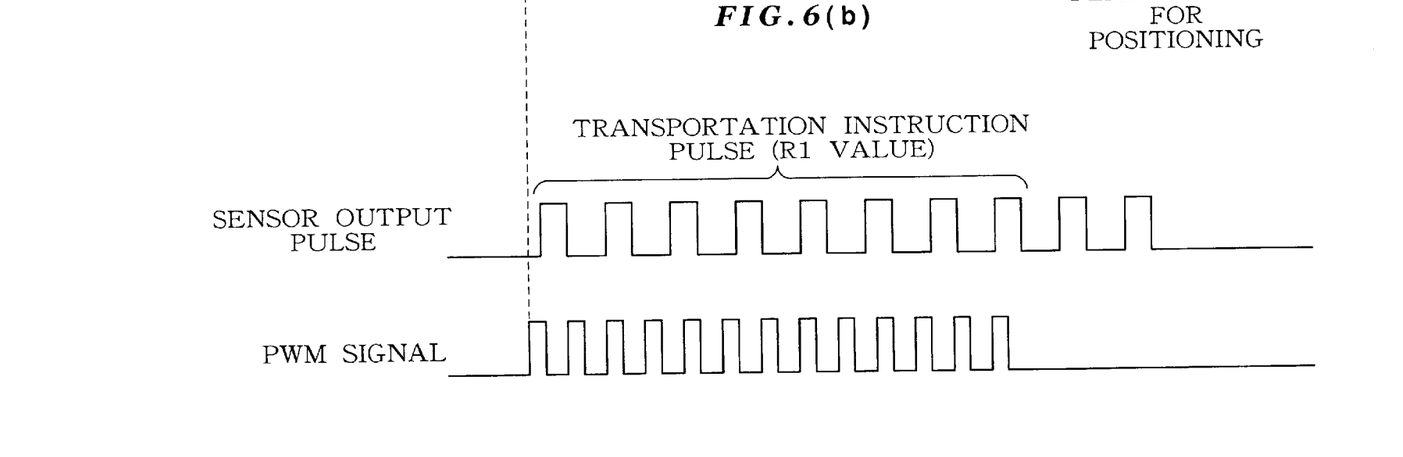
FIG. 6(b) is a conceptual view showing a relationship between a return pulse from an optical sensor and an output signal of a PWM (pulse width modulation) control circuit.

FIG. 6(a) and FIG. 6(b) show a relationship between an actual feed amount of the data storage medium holding block 104 and the power supply to the motor 3, and a relationship between the return pulse from the optical sensor 15 and an output signal from the PWM control circuit 18.

Since the data storage medium transportation unit 1 according to the present embodiment utilizes a non-servo motor such as a DC motor as the motor 3, operation of the data storage medium holding block 104 will not stop immediately after the power supply to the motor 3 is stopped. A certain amount of overrun is caused by the inertia of the rotor and the rotary shaft 6 of the motor 3.

Accordingly, in this embodiment, as shown in FIG. 6(b), the feed instruction pulse value is deleted by the feed amount by overrun and a resultant value is loaded on the register R1 in step S2.

In the processing described below, after the motor 3 is started to rotate by the PWM control circuit 18, the operation of the PWM control circuit 18 is stopped and the drive power for the motor 3 is stopped when the value of the pulse count detected by the optical sensor 15 has reached the value set in the register RI shown in FIG. 6(b). As has been described above, the motor 3 continues to rotate for a while because of the inertia of the rotor and the rotary shaft 6 and the data storage medium holding block 104 continues to be fed as shown in FIG. 6(a). However, the drive power for the motor 3 is stopped as shown in FIG. 6(a) and FIG. 6(b) before the data storage medium holding block 104 reaches the target position. By utilizing the overrun, the final stop position of the data storage medium holding block 104 can be matched with a predetermined target position.

Moreover, the actual overrun amount fluctuates due to stains and abrasion of the power transmission mechanism 4. However, as has been described above, the helical groove 7 of the rotary shaft 6 in this embodiment has the flat portions 7a, 7b, 7c, and 7d. In order to accurately position the data storage medium holding block 104, as shown in FIG. 6(a), the final rotation stop position of the rotary shaft 6 need to be within this range of a flat portion. Actually, there is no problem of overrun fluctuation. Thus, there is no need of feedback control for the positioning.

After the feed instruction pulse and the duty ration are set, the MPU 19 initializes a counter C for counting the feed distance in an accumulative manner (step S3) and detects whether the input from the optical sensor 15 is ON, i.e., whether the optical sensor 15 detects an identification area 17 of the rotation position detector 14 (step S4). If the optical sensor 15 is not detecting the identification area 17, 0 is set in a state storage flag F (step S5), and if the optical sensor 15 detects the identification area 17, 1 is set in the state storage flag F (step S6).

Next, the MPU 19 activates the PWM control circuit 18 to start drive of the motor 3 (step S7), initializes a timer T to restart (step S8), and initializes a counter ΔC for counting a feed distance within a set time (step S9).

Next, the MPU 19 determines whether the state storage flag F is 0, i.e., whether the optical sensor has detected an identification area 17 of the rotation position detector 14 during a preceding detection cycle (step S10).

When the decision of step S10 is true, i.e., the optical sensor has not detected any identification area 17 and the state storage flag F is 0, the MPU 19 as the counter waits until the optical sensor 15 detects an identification area 17 (step S11), increments the value of the counter C for counting a feed distance in an accumulative manner and the value of the counter ΔC for counting a feed distance within a set time (step S12, step S13), and sets 1 in the state storage flag F so as to store the detection of an identification area 17 of the rotation position detector 14 (step S14).

Next, the MPU 19 determines whether the current value of the counter C has reached the feed instruction pulse value, i.e., whether feed corresponding to the operation instruction has been completed (step S15). If the feed has not been completed, it is determined whether the time count of the timer T has reached the set time Δt (step S18). If the result of step S18 is false, i.e., the time count of the timer T has not reached the set time Δt, control is returned to step S10 to repeat the aforementioned processing.

On the other hand, if the result of step S10 is false, i.e., if the optical sensor 15 has detected an identification area 17, the MPU 19 waits until no identification area 17 is detected (step S16), sets 0 in the state storage flag F, and stores that no identification area 17 of the rotation position detector 14 is detected (step S17).

Next, the MPU 19 determines whether the time count of the timer T has reached the set time Δt (step S18). If the time count of the timer T has not reached the set time Δt, control is returned again to the process of step S10.

That is, the process of steps S10 to S14 and the process of steps S16 and S17 are for the optical sensor 15 to detect a start of an identification area 17, i.e., a change from dark to light state and to increment the counter C and the counter ΔC. In this embodiment, each time the rotary shaft 6 rotates by 10 degrees, the counter C and the counter ΔC are incremented.

If the decision process of step S18 detects that the time count of the timer T has reached the set time Δt while the counter C and the counter ΔC are incremented, the MPU 19 as the speed error detection means reads a current value of the counter ΔC and determines whether the current value is between the detection pulse count C1 corresponding to the lower limit of a predetermined reference speed range and the detection pulse count C2 corresponding to the upper limit of the predetermined reference speed range (step S19).

If the current value of the counter ΔC is in a range from the lower value C1 to the upper value C2, the MPU 19 determines that an appropriate feed speed control is performed according to the duty ratio of the PWM control circuit 18 and resets the values of the timer T and the counter ΔC (step S8, step S9), so as to repeat the aforementioned process.

It should be noted that in the present embodiment, the value of the detected pulse count ΔC per the set time Δt is utilized as a value of the feed speed of the data storage medium holding block 104. The actual feed speed of the data storage medium holding block 104 can be obtained by a value [(ΔC/Δt)/(10 degrees/360 degrees)] (the number of revolutions of the rotary shaft 6 per second) multiplied by the lead of the helical groove 7 (a feed amount per revolution of the rotary shaft 6). The only difference between the actual feed speed of the data storage medium holding block 104 and the detected pulse count ΔC is present or absence of a coefficient. Accordingly, there is no problem if the value of ΔC itself is used as a feed speed. That is, the counter ΔC as the counter for counting the number of pulses per the set time Δt also serves a function of feed speed calculator.

Moreover, the decision process of step S19 is repeatedly performed each time the set time Δt has elapsed (step S18) until the current value of the counter C reaches the feed instruction pulse value set in the register R1 (S15). Accordingly, it is possible to monitor the feed speed to find an error if any while the data storage medium holding block 104 is moving.

Moreover, the flat portions 7a, 7b, 7c, and 7d of the helical groove 7 of the rotary shaft 6 where no vertical displacement of the data storage medium holding block 104 is caused. The feed speed detected by the counter ΔC is a rotation speed of the rotary shaft 6 and not the vertical movement speed of the data storage medium holding block 104. Even if the protrusion 8 is engaged with one of the flat portions 7a, 7b, 7c, and 7d, this will not be detected as an error of the feed speed.

Thus, while continuing the PWM control of the motor 3, the current value of the counter C for counting the total feed amount reaches the feed instruction pulse value set in the register R1. When the step S15 determines that a feed corresponding to a given operation instruction is complete, the MPU 19 terminates the operation of the PWM control circuit 18 to stop the vertical movement of the data storage medium holding block 104 (step S20), thus completing all the processes for a single operation instruction.

Moreover, if the result of the step S19 has become false while continuing the PWM control of the motor 3, i.e., if an error of the feed speed is detected, the MPU 19 terminates operation of the PWM control circuit 18 and outputs an error detection signal, or returns the data storage medium holding block 104 to its home position (step S21), terminating the process associated with the current operation instruction. It is possible to design a retry operation after return to the home position.

The error of the feed speed is caused by a speed increase due to abrasion of components of the power transmission mechanism 4 or a speed decrease due to a load increase caused by stains of interference between mechanical components. Accordingly, in practice, the error of the feed speed detection can detect a failure of the drive system. For example, it is possible to periodically inspect the drive system by giving an operation instruction to feed the data storage medium holding block 104 from the lower limit to the upper limit at the stage of initialization at each time power is turned on.

Explanation has been given on the open loop control of the feed speed of the data storage medium holding block 104, detecting only a feed speed error. However, by modifying the processes shown in FIG. 4 and FIG. 5, it is also possible to perform a simplified feed back control of the feed speed.

For example, a target speed serving as a reference is stored in the speed controller 2 as the detected pulse value C0 during the set time Δt. When the decision result of step S18 has become true, a difference between a current value of the counter Δc and the reference value C0, i.e., [C0−ΔC] is obtained, instead of the processes of steps S19 and S21, and the duty ratio of the PWM control circuit is adjusted according to this difference before control is returned to the process of step S8. Such an algorithm can be performed for feedback control of the feed speed.

More specifically, a file containing a duty ratio for speed adjustment corresponding to the value of difference [C0−ΔC] is stored as a speed adjuster in the nonvolatile memory 22 or the like, and an appropriate duty ratio is selected from this speed adjuster according to the value of [C0−ΔC], so as to be reset in the PWM control circuit 18. If [C0−ΔC]>0 and the current speed is slower than the target speed, power supply to the motor 3 is increased by setting a duty ratio having a relatively long ON time in the PWM control circuit 18. On the contrary, if [C0−ΔC]<0 and the current speed is faster than the target speed, the power supply to the motor 3 is decreased by setting a duty ratio having a relatively short ON time in the PWM control circuit 18.

Moreover, instead of storing the file serving as the speed adjuster in the nonvolatile memory 22 or the like, it is possible to execute a calculation to obtain a duty ratio corresponding to the speed difference and setting the obtained value in the PWM control circuit 18.

In the data storage medium transportation unit according to the present invention, the feed speed of the data storage medium holding block is controlled by the PWM control with respect to a non-servo motor. There is no need of using an expensive servo motor and the production cost is reduced. Moreover, the rotary portion of the power transmission mechanism includes a rotation position detector having a plurality of identification areas and an optical sensor, so that the number of the identification areas detected by the optical sensor within a predetermined period of time can be counted by the counter, thus calculating the feed speed of the data storage medium holding block. Accordingly, there is no need of a complicated servo control associated with speed and position feedback. It is possible to detect the feed speed of the data storage medium holding block according to the resolution of the identification areas.

Moreover, the feed speed of the data storage medium holding block calculated by the feed speed calculator is compared to a reference speed range and if the feed speed of the data storage medium holding block is deviated from the reference speed range, a speed error is detected. Thus, it is possible to automatically detect a feed speed error of the data storage medium holding block.

Furthermore, a difference between the feed speed calculated by the feed speed calculator and a target speed is obtained so that this difference is used to adjust the duty ratio in the PWM control. Substantially, a feedback control of the feed speed equivalent to the one using a servo motor can be realized.

Moreover, the data storage medium holding block has a protrusion which is engaged with the helical groove of the rotary shaft. With rotation of the rotary shaft, the data storage medium holding block is moved vertically via the protrusion. Furthermore, the helical groove has lead zero portions, so that rough position control of the rotary shaft can accurately position the data storage medium holding block. In spite of that no feedback control associated with positioning is performed, it is possible to achieve an accuracy both in speed and position equivalent to an apparatus of an ordinary servo control type.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-172617 (Filed on Jun. 18th, 1999) including specification, claims, drawings and summary are incorporated herein by reference in its entirety.

What is claimed is:

1. A data storage medium transportation unit comprising:
   a data storage medium holding block which holds a data storage medium and reciprocally moves between a data storage medium container constituted to contain a plurality of data storage media and a read/write block for reading and writing a data from/to a data storage medium;
   a motor which is a non-servo motor for driving the data storage medium holding block;
   a power transmission mechanism arranged between the data storage medium holding block and the motor for converting a rotary power of the motor into a drive force of the data storage medium holding block in its travelling direction;
   a disc-shaped rotation position detector provided in a rotary portion of the power transmission mechanism and having a plurality of identification areas arranged at an identical interval in a circumferential direction;
   an optical sensor provided on a non-movable portion of the data storage medium transportation unit and arranged so as to detect the identification areas of the rotation position detector;
   a speed control block for PWM (pulse width modulation) control of the non-servo motor, said speed control block including a counter for counting the number of identification areas detected by the optical sensor within a predetermined period of time, and a feed speed calculator for calculating a feed speed of the data storage medium holding block according to a value obtained by the counter.

2. A data storage medium transportation unit as claimed in claim 1, said unit further comprising a feed speed error detector which compares the feed speed calculated by the feed speed calculator to a predetermined reference speed range and issues a speed error if the feed speed calculated by the feed speed calculator is out of the reference speed range.

3. A data storage medium transportation unit as claimed in claim 2, wherein the feed speed calculator repeatedly calculates feed speed of the data storage medium holding block with a cycle of the predetermined period of time.

4. A data storage medium transportation unit as claimed in claim 3, said unit further comprising a speed adjuster which calculates a difference between the feed speed obtained by the feed speed calculator and a target speed and adjusts a duty ratio in the PWM control according to the difference.

5. A data storage medium transportation unit as claimed in claim 4, wherein the identification areas are defined by slits extending in radial directions of the disc-shaped rotation position detector and the optical sensor consists of a light emitting block and a light receiving block which are arranged so as to sandwich the disc-shaped rotation position detector.

6. A data storage medium transportation unit as claimed in claim 3, wherein the identification areas are defined by slits extending in radial directions of the disc-shaped rotation position detector and the optical sensor consists of a light emitting block and a light receiving block which are arranged so as to sandwich the disc-shaped rotation position detector.

7. A data storage medium transportation unit as claimed in claim 2, wherein the identification areas are defined by slits extending in radial directions of the disc-shaped rotation position detector and the optical sensor consists of a light emitting block and a light receiving block which are arranged so as to sandwich the disc-shaped rotation position detector.

8. A data storage medium transportation unit as claimed in claim 2, wherein the power transmission mechanism includes a guide member for guiding the feed direction of the data storage medium holding block, a rotary shaft having a helical groove on the outer circumference and arranged along the guide direction of the guide member, and a protrusion provided on the data storage medium holding block so as to be engaged with the groove of the rotary shaft,
   said helical groove of the rotary shaft having lead-zero flat portions for positioning.

9. A data storage medium transportation unit as claimed in claim 1, wherein the feed speed calculator repeatedly calculates feed speed of the data storage medium holding block with a cycle of the predetermined period of time.

10. A data storage medium transportation unit as claimed in claim 3, said unit further comprising a speed adjuster which calculates a difference between the feed speed obtained by the feed speed calculator and a target speed and adjusts a duty ratio in the PWM control according to the difference.

11. A data storage medium transportation unit as claimed in claim 10, wherein the identification areas are defined by slits extending in radial directions of the disc-shaped rotation position detector and the optical sensor consists of a light emitting block and a light receiving block which are arranged so as to sandwich the disc-shaped rotation position detector.

12. A data storage medium transportation unit as claimed in claim 10, wherein the power transmission mechanism includes a guide member for guiding the feed direction of the data storage medium holding block, a rotary shaft having a helical groove on the outer circumference and arranged along the guide direction of the guide member, and a protrusion provided on the data storage medium holding block so as to be engaged with the groove of the rotary shaft,
    said helical groove of the rotary shaft having lead-zero flat portions for positioning.

13. A data storage medium transportation unit as claimed in claim 9, wherein the identification areas are defined by slits extending in radial directions of the disc-shaped rotation position detector and the optical sensor consists of a light emitting block and a light receiving block which are arranged so as to sandwich the disc-shaped rotation position detector.

14. A data storage medium transportation unit as claimed in claim 9, wherein the power transmission mechanism includes a guide member for guiding the feed direction of the data storage medium holding block, a rotary shaft having a helical groove on the outer circumference and arranged along the guide direction of the guide member, and a protrusion provided on the data storage medium holding block so as to be engaged with the groove of the rotary shaft, said helical groove of the rotary shaft having lead-zero flat portions for positioning.

15. A data storage medium transportation unit as claimed in claim 1, wherein the identification areas are defined by slits extending in radial directions of the disc-shaped rotation position detector and the optical sensor consists of a light emitting block and a light receiving block which are arranged so as to sandwich the disc-shaped rotation position detector.

16. A data storage medium transportation unit as claimed in claim 15, wherein the power transmission mechanism includes a guide member for guiding the feed direction of the data storage medium holding block, a rotary shaft having a helical groove on the outer circumference and arranged along the guide direction of the guide member, and a protrusion provided on the data storage medium holding block so as to be engaged with the groove of the rotary shaft, said helical groove of the rotary shaft having lead-zero flat portions for positioning.

17. A data storage medium transportation unit as claimed in claim 1, wherein the power transmission mechanism includes a guide member for guiding the feed direction of the data storage medium holding block, a rotary shaft having a helical groove on the outer circumference and arranged along the guide direction of the guide member, and a protrusion provided on the data storage medium holding block so as to be engaged with the groove of the rotary shaft, said helical groove of the rotary shaft having lead-zero flat portions for positioning.

* * * * *